United States Patent
Lee

(10) Patent No.: US 9,464,662 B2
(45) Date of Patent: Oct. 11, 2016

(54) BALL JOINT UNIT

(75) Inventor: Suhyoung Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 262 days.

(21) Appl. No.: 13/472,015

(22) Filed: May 15, 2012

(65) Prior Publication Data
US 2013/0004233 A1    Jan. 3, 2013

(30) Foreign Application Priority Data

Jun. 29, 2011    (KR) .................. 10-2011-0064008

(51) Int. Cl.
*F16C 11/06*    (2006.01)

(52) U.S. Cl.
CPC .......... *F16C 11/0604* (2013.01); *F16C 11/068* (2013.01); *Y10T 403/32631* (2015.01); *Y10T 403/32696* (2015.01)

(58) Field of Classification Search
CPC .................................................. F16C 11/068
USPC ........ 403/120, 122, 130, 139; 384/213, 214, 384/293; 464/15
See application file for complete search history.

(56) References Cited

U.S. PATENT DOCUMENTS

| | | | | |
|---|---|---|---|---|
| 1,882,956 | A * | 10/1932 | Sandler | 384/293 |
| 2,971,787 | A | 2/1961 | Lincoln et al. | |
| 4,630,957 | A | 12/1986 | Ausprung | 403/76 |
| 4,858,962 | A * | 8/1989 | Bolling et al. | 285/121.7 |
| 6,042,294 | A * | 3/2000 | Urbach | 403/135 |
| 6,109,816 | A * | 8/2000 | Iwasaki | 403/135 |
| 6,250,840 | B1 * | 6/2001 | Urbach et al. | 403/135 |
| 6,702,502 | B1 * | 3/2004 | Graber | 403/34 |
| 6,739,786 | B2 * | 5/2004 | Reniau | 403/39 |
| 7,037,022 | B2 * | 5/2006 | Bernhardt et al. | 403/114 |
| 7,938,417 | B2 * | 5/2011 | Ersoy et al. | 280/124.134 |
| 2004/0265046 | A1 * | 12/2004 | Hoppner et al. | 403/122 |
| 2006/0153632 | A1 * | 7/2006 | Bernhardt et al. | 403/122 |
| 2007/0140784 | A1 | 6/2007 | Yokohara | |
| 2009/0080820 | A1 * | 3/2009 | Matyscak et al. | 384/293 |
| 2011/0243650 | A1 * | 10/2011 | Linares | 403/122 |

FOREIGN PATENT DOCUMENTS

| | | |
|---|---|---|
| DE | 857715 C | 12/1952 |
| JP | 63-168318 U1 | 11/1988 |
| JP | H02-253008 A | 10/1990 |
| JP | H09-177786 A | 7/1997 |
| JP | 2008-169953 A | 7/2008 |

OTHER PUBLICATIONS

European Search Report dated Oct. 9, 2012 in European Application No. 12167513.6, filed May 10, 2012.
Japanese Office Action dated Feb. 16, 2016 in Japanese Application No. 2012-114611.

* cited by examiner

*Primary Examiner* — Jonathan Masinick
(74) *Attorney, Agent, or Firm* — Saliwanchik, Lloyd & Eisenschenk

(57) ABSTRACT

A ball joint unit is provided and can include a ball member, a plurality of lubricant reception recesses formed on a surface of the ball member, each having a predetermined depth, a rod member connected to a first element to be integrally formed with the ball member, and a retainer connected to a second element and formed with a spherical ball member receptor corresponding in shape to the ball member, wherein the lubricant is accommodated and coated in an interior of the lubricant recesses and a surface of the ball member.

8 Claims, 3 Drawing Sheets

BALL JOINT UNIT

CROSS-REFERENCE TO RELATED APPLICATION

This application claims the benefit under 35 U.S.C. §119 of Korean Patent Application No. 10-2011-0064008, filed Jun. 29, 2011, which is hereby incorporated by reference in its entirety.

BACKGROUND

1. Field of the Disclosure

Exemplary embodiments of the present disclosure may relate to a ball joint unit.

2. Discussion of the Related Art

A ball joint unit is connection means for connecting two mutually different elements and enabling a relative movement between the connected mutually different elements.

Generally, the ball joint unit is configured in such a manner that a distal end of a rod member connected to a first element is formed with a ball member, and a second element connected to the first element is provided with a retainer, where the ball member is insertedly coupled to a spherical space provided inside the retainer.

Meantime, the ball member of the ball joint inserted into the inner space of the retainer is generally coated with a lubricant such as grease to reduce wear, where if the ball member is repeatedly moved, the grease coated on the surface is exposed to the outside to gradually lose the lubricant performance.

Particularly, if the ball joint is installed at a position difficult to continuously pour the lubricant, the ball member and/or the retainer are disadvantageously worn by friction between the ball member and the retainer performing real time rotation and twist, to destruct the ball joint unit.

BRIEF SUMMARY

Therefore, the present disclosure is directed to address one or more of the above disadvantages/problems and to provide a ball joint unit configured to enhance lubricant receptivity.

Technical subjects to be solved by the present disclosure are not restricted to the above-mentioned description, and any other technical problems not mentioned so far will be clearly appreciated from the following description by the skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

In one general broad aspect of the present disclosure, there is provided a ball joint unit, the unit comprising: a ball member; a plurality of lubricant reception recesses formed on a surface of the ball member, each having a predetermined depth; a rod member connected to a first element to be integrally formed with the ball member; and a retainer connected to a second element and formed with a spherical ball member receptor corresponding in shape to the ball member, wherein the lubricant is accommodated and coated in an interior of the lubricant recesses and a surface of the ball member.

Preferably, each lubricant reception recess is flat at a floor surface, and the floor surface is formed in parallel with an axial direction of the rod member.

Preferably, the lubricant reception recess is chamfered by a connection portion of the surface of the ball member.

Preferably, the lubricant is a semi-solid lubricant like grease.

Preferably, the ball member is flatly-formed at a distal end to avoid contacting an inner circumferential surface of the ball member receptor.

Preferably, the retainer is configured in such a manner that a ball member support portion wrapping an upper end of the ball member is protruded to a rod member direction.

Preferably, the ball member support portion is formed with a diameter smaller than that of the ball member and greater than that of the rod member.

Preferably, the retainer is formed with a rubber material.

The ball joint unit according to exemplary embodiments of the present disclosure has an advantageous effect in that the ball member constituting the ball joint unit is superficially formed with a plurality of recesses like those on a golf ball, where the plurality of recesses accommodates lubricant therein, thereby maximally maintaining performance of the ball joint unit for a long time without any frequent re-filling of the lubricant.

BRIEF DESCRIPTION OF THE DRAWINGS

Accompanying drawings are included to provide a further understanding of arrangements and embodiments of the present disclosure and are incorporated in and constitute a part of this application. Now, non-limiting and non-exhaustive exemplary embodiments of the disclosure are described with reference to the following drawings, in which.

Figure 1:
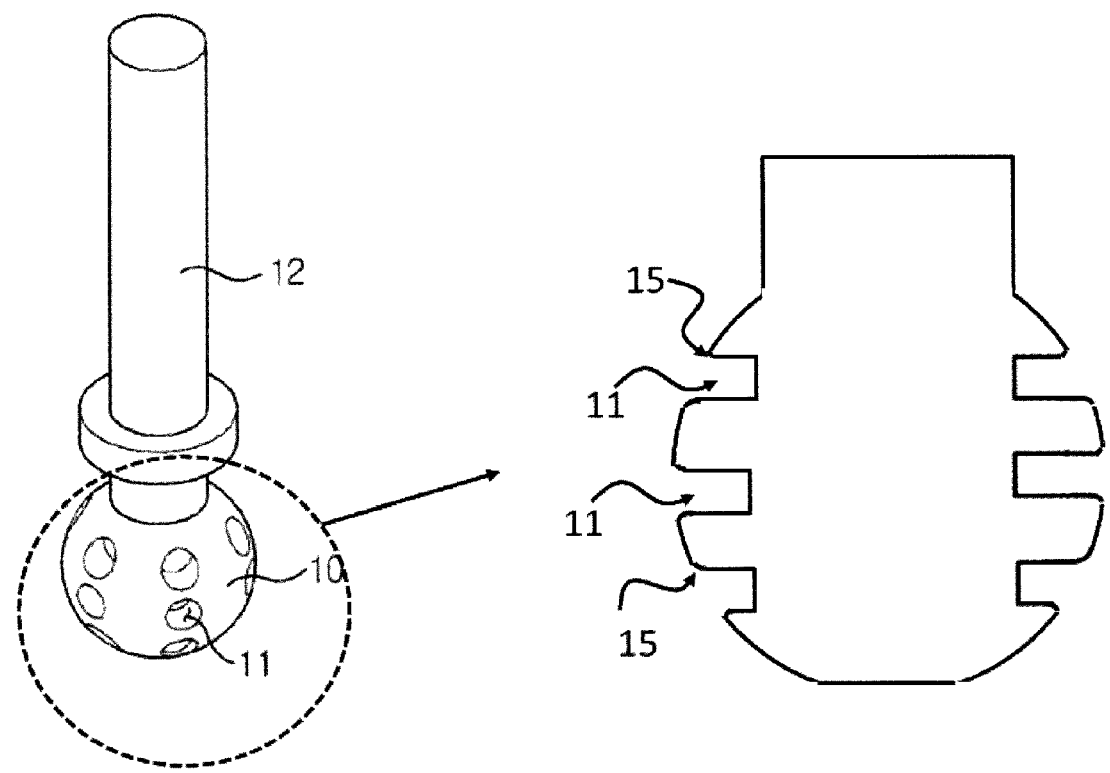
FIG. 1 is a perspective view illustrating a ball joint unit according to an exemplary embodiment of the present disclosure.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the method particularly pointed out in the written description and claims hereof as well as the appended drawings.

DETAILED DESCRIPTION

Hereinafter, exemplary embodiments of the present disclosure are described in detail with reference to the accompanying drawings. It will be appreciated that for simplicity and/or clarity of illustration, elements illustrated in the figure have not necessarily been drawn to scale. For example, the dimensions of some of the elements may be exaggerated relative to other elements for clarity. Further, if considered appropriate, reference numerals have been repeated among the figures to indicate corresponding and/or analogous elements.

In describing the present disclosure, detailed descriptions of constructions or processes known in the art may be omitted to avoid obscuring appreciation of the invention by a person of ordinary skill in the art with unnecessary detail regarding such known constructions and functions.

Accordingly, particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms "comprise" and "include", along with their derivatives, may be used and are intended as synonyms for each other. Furthermore, the terms "including", "includes", "having", "has", "with", or variants thereof are used in the detailed description and/or the claims to denote non-exhaustive inclusion in a manner similar to the term "comprising".

Words such as "thereafter", "then", "next", etc. are not intended to limit the order of the processes; these words are simply used to guide the reader through the description of the methods. The terms "first", "second", and the like, herein do not denote any order, quantity, or importance, but rather are used to distinguish one element from another, and the terms "a" and "an" herein do not denote a limitation of quantity, but rather denote the presence of at least one of the referenced item.

In describing the present disclosure, detailed descriptions of constructions or processes known in the art may be omitted to avoid obscuring appreciation of the invention by a person of ordinary skill in the art with unnecessary detail regarding such known constructions and functions.

Now, a ball joint unit according to exemplary embodiments of the present disclosure will be described in detail with reference to the accompanying drawings.

FIG. 1 is a perspective view illustrating a ball joint unit according to an exemplary embodiment of the present disclosure.

Referring to FIG. 1, a ball joint unit according to the present disclosure is characteristically configured in such a fashion that a ball member (10) and a rod member (12) are integrally formed, and a surface of the ball member (10) is formed with a plurality of lubricant reception recesses (11).

Preferably, the ball member (10) is provided with an approximately spherical ball member receptor, and a distal end of the ball member is flatly formed.

Each of the lubricant recesses (11) on the surface of the ball member (10) is provided with a recess shape with a different depth based on position. That is, as illustrated in FIG. 2, a floor surface of the lubricant recess (11) is flatly provided relative to a central axis of the rod member (12), a depth of each lubricant recess (11) to a longitudinal direction of the ball member (10) is differently formed, while a depth of each lubricant recess (11) to a latitudinal direction of the ball member (10) is identically formed.

The lubricant recess (11) may be chamfered by a connection portion of the surface of the ball member, whereby amount of lubricant accommodated into the lubricant recess (11) can be maximized, and the accommodated lubricant can be easily transferred to the surface of the ball member (10).

Meanwhile, the lubricant accommodated inside the lubricant recess (11) is preferably a semi-solid lubricant such as grease. Although a liquid or solid lubricant may be used, but the liquid lubricant can be easily leaked out and is not suitable for a long time of use, and it is difficult to use the solid lubricant as the solid lubricant is difficult to be poured into the recess.

Figure 2:
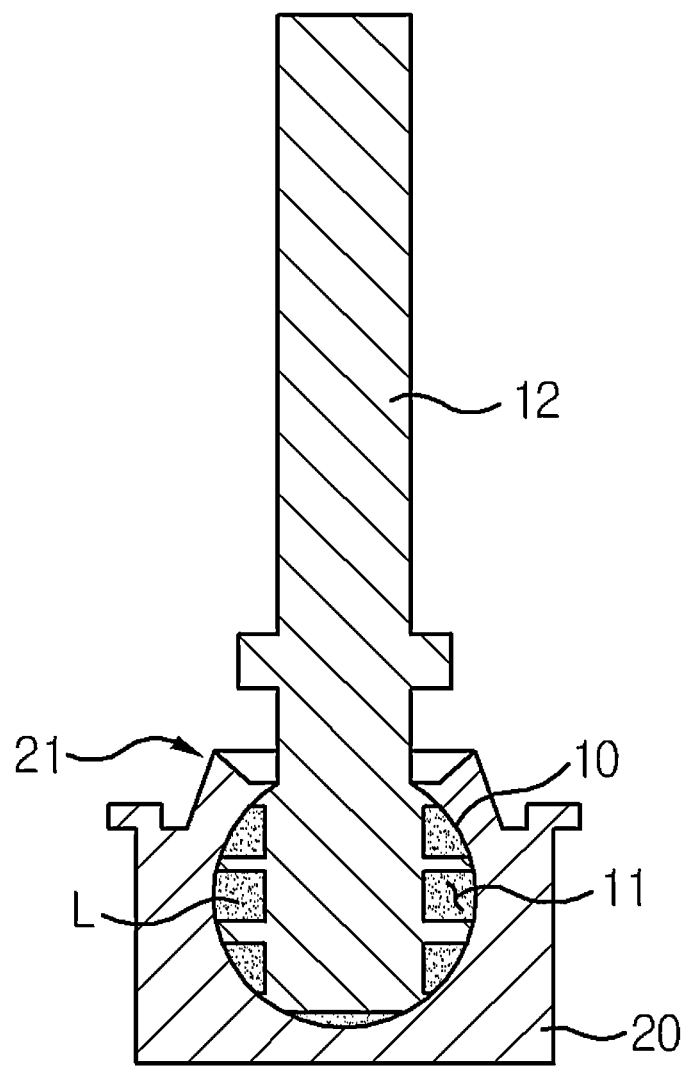
FIGS. 2 and 3 are schematic views illustrating a ball joint coupled to a retainer of FIG. 1 according to the present disclosure.
Figure 3:
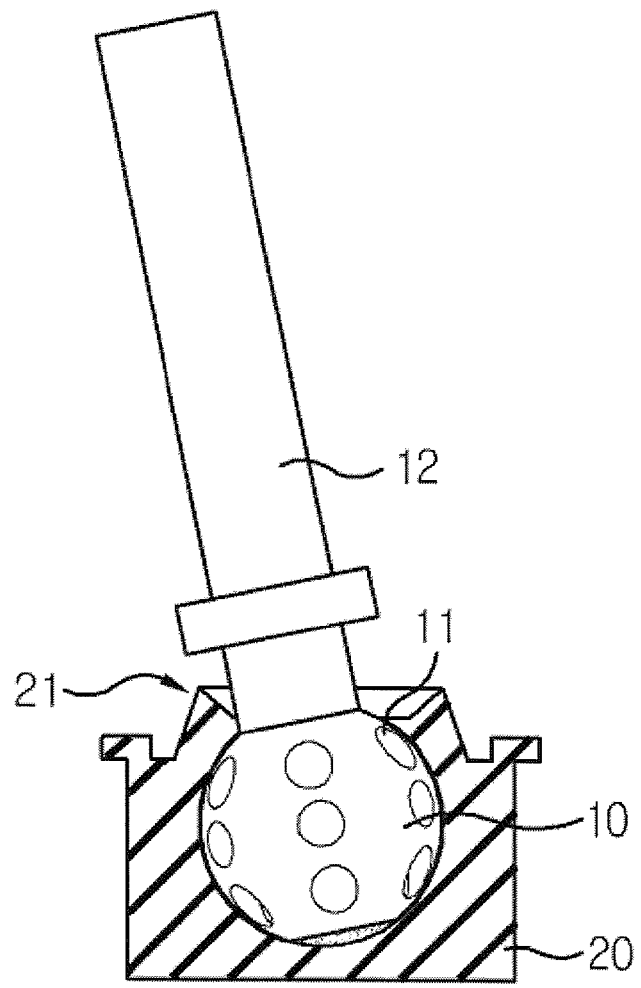

The ball joint unit thus configured is rotatably coupled to a retainer (20) as shown in FIGS. 2 and 3. The retainer (20) is to accommodate the ball member (10), and corresponds in shape to the ball member. The retainer (20) is formed with a space coated with lubricant (L).

The retainer (20) the retainer is configured in such a manner that a ball member support portion (21) wrapping an upper end of the ball member is protruded to a rod member direction, so that the lubricant (L) poured into the retainer (20) can be inhibited from leaking. The ball member support portion (21) is formed with a diameter smaller than that of the ball member (10) and greater than that of the rod member (12).

Meanwhile, a distal end of the ball member (10) inserted into an interior of the retainer (20) is preferably flat. In a case the distal end of the ball member (10) is flatly formed, a distal end of the ball member (10) which is a distal end of the ball joint unit is inhibited from being contacted with an inner circumferential surface of a ball member receptor. Thus, as shown in FIGS. 2 and 3, the lubricant (L) can be additionally accommodated in a space formed between the distal end and the inner circumferential surface of a ball member receptor. The space, along with the lubricant recess (11), can perform an operation of additional supply of the lubricant.

Now, an operation of the ball joint unit according to the present disclosure will be described.

With continuing reference to FIGS. 2 and 3, the ball joint unit according to the present disclosure.

In comparison with the conventional ball joint unit, the ball member (10) constituting the ball joint unit is superficially formed with a plurality of recesses like those on a golf ball, where the plurality of recesses accommodates semi-solid lubricant therein, thereby maximally maintaining performance of the ball joint unit for a long time without any frequent re-filling of the lubricant.

That is, the lubricant coated on the surface of the ball member (10) is fully supplied among the interior of the lubricant recesses (11), the distal end of the ball member (10) and the inner circumferential surface of the a ball member receptor, when the ball joint unit is assembled.

At the same time, an inner lateral surface of the retainer (20) coupled by the ball member (10) is also coated with the lubricant (L).

Meanwhile, material of retainer (20) may be provided with rubber or the like if the retainer is not positioned at a place not applied with a heavy load. If the retainer (20) is formed with rubber, it may be easy to insertedly couple the ball member (10). However, in a case the ball member (10) is excessively twisted, initially poured lubricant may be leaked and prematurely depleted, under which the retainer (20) rather softer than the ball member (10) may be excessively worn out.

Meanwhile, if the structure is applied that is formed with a plurality of lubricant recesses provided on the surface according to the present disclosure, and even if the lubricant (L) poured into the retainer (20) is leaked, the lubricant (L) accommodated inside the lubricant recesses (11) seeps out little by little onto the surface of the ball member (10) to supplement the insufficient lubricant.

Furthermore, if a plurality of lubricant recesses is formed on the surface of the ball member (10), an area surface-contacted by the inner circumferential surface of the ball member receptor at the retainer (20) and the ball member (10) is substantially reduced to subsequently reduce a surface area on which the lubricant acts, whereby the ball joint unit can be used for a long time without any re-filling of the lubricant. At the same time, the surface that is surface-contacted is also reduced to advantageously decrease the frictional force.

Still furthermore, an upper end of the ball member (10) is wrapped by the ball member support portion (21) to inhibit the lubricant (L) accommodated inside the lubricant recesses (11) and the retainer (20) from leaking out to an outside of the retainer (20).

As apparent from the foregoing, the ball joint unit according to the present disclosure has an industrial applicability in that the ball member constituting the ball joint unit is superficially formed with a plurality of recesses like those on a golf ball, where the plurality of recesses accommodates lubricant therein, thereby maximally maintaining performance of the ball joint unit for a long time without any frequent re-filling of the lubricant.

The previous description of the present disclosure is provided to enable any person skilled in the art to make or use the invention. Various modifications to the disclosure will be readily apparent to those skilled in the art, and the generic principles defined herein may be applied to other variations without departing from the spirit or scope of the disclosure. Thus, the instant disclosure is not intended to limit the examples described herein, but is to be accorded the widest scope consistent with the principles and novel features disclosed herein.

What is claimed is:

1. A ball joint unit, the unit comprising:
   a ball member;
   a plurality of lubricant reception recesses formed on a surface of the ball member;
   a rod member connected to a first element to be integrally formed with the ball member; and
   a retainer connected to a second element and formed with a spherical ball member receptor corresponding in shape to the ball member;
   wherein a lubricant is accommodated and coated in an interior of the lubricant reception recesses and a surface of the ball member;
   wherein each lubricant reception recess has a predetermined amount of the lubricant accommodated therein and the ball joint unit is configured such that the accommodated lubricant in the lubricant reception recess is transferred to the surface of the ball member;
   wherein an entire inner surface of the ball member receptor is spherical;
   wherein the ball member is flatly-formed at a distal end facing the spherical inner surface of the ball member receptor to inhibit contact with the spherical inner surface of the ball member receptor;
   wherein the lubricant is accommodated in a space formed between the distal end of the ball member and the inner circumferential surface of the ball member receptor;
   wherein a depth of each lubricant reception recess in a longitudinal direction is different from that of the other lubricant reception recesses, while a depth of each lubricant reception recess in a latitudinal direction is identical to that of the other lubricant reception recesses, and
   wherein each lubricant reception recess is flat at a floor surface, the floor surface is formed in parallel with an axial direction of the rod member, and the floor surface of each lubricant reception recess is aligned on a straight line with the axial direction of the rod member.

2. The ball joint unit of claim 1, wherein the lubricant is a semi-solid lubricant.

3. The ball joint unit of claim 2, wherein the retainer is formed with a rubber material.

4. The ball joint unit of claim 1, wherein the retainer is configured in such a manner that a ball member support portion wrapping an upper end of the ball member is protruded to a rod member direction.

5. The ball joint unit of claim 4, wherein the ball member support portion is formed with a diameter smaller than that of the ball member and greater than that of the rod member.

6. The ball joint unit of claim 4, wherein the retainer is formed with a rubber material.

7. The ball joint unit of claim 5, wherein the retainer is formed with a rubber material.

8. The ball joint unit of claim 1, wherein the retainer is formed with a rubber material.

* * * * *